Patented Jan. 20, 1953

2,626,262

UNITED STATES PATENT OFFICE 2,626,262

ALKADIENYL PYRIDYL AND PHENYL ALKYLENE DIAMINES, AND METHOD OF PREPARING SAME

William A. Lott, Maplewood, and Edward Pribyl, New Brunswick, N. J., assignors to Mathieson Chemical Corporation, New York, N. Y., a corporation of Virginia No Drawing. Application September 28, 1950, Serial No. 187,344

7 Claims. (Cl. 260—296)

This invention comprises: (I) bases of the general formula

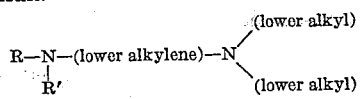

wherein R is a member of the class consisting of alkadienyl, and halo-alkadienyl groups; and R' is a member of the class consisting of phenyl and 2-pyridyl groups; (II) acid-addition salts of these bases; and (III) a method of preparing compounds I and II, which essentially comprises interacting a member of the group consisting of alkadienyl halides, and halo-alkadienyl halides, with a compound of the general formula

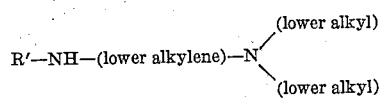

in an organic solvent for the reactants in the presence of an alkaline condensing agent, R' having the meaning given hereinbefore.

[The terms "lower alkylene," "lower alkyl," and "alkadienyl" are employed herein in their broad sense, hence include branched as well as straight chains.]

The preferred compounds of this invention are those in which R' is 2-pyridyl, and/or the lower alkylene group is ethylene, and/or each of the lower alkyl groups is methyl.

The compounds of this invention are valuable histamine-antagonizing agents, being therapeutically effective in the treatment of nasal allergies, urticaria, angioneurotic edema, serum sickness, and reactions from penicillin, streptomycin, sulfonamides and other drugs, and being more potent and/or less toxic than the prior compounds not embodying the alkadienyl or haloalkadienyl groups.

The alkaline condensing agents utilizable for the purposes of this invention comprise sodamide, lithium amide (metallic), alkali metals (such as sodium and potassium), and (solid) alkali metal hydroxides (such as NaOH and KOH), inter alia.

The organic solvent for the reactants should, of course, be substantially-dry and inert. Solvents utilizable for the purposes of this invention comprise, in addition to the preferred aromatic hydrocarbons (such as toluene, benzene, and the xylenes): aliphatic hydrocarbons (such as hexane and heptane), and cycloaliphatic hydrocarbons (such as cyclohexane), and mixtures thereof, inter alia.

The bases obtained by the condensation may be converted into addition salts with acids in the conventional manner, i. e., by reacting the base with the desired acid in a suitable solvent. The utilizable acids comprise: hydrochloric, hydrobromic, boric, nitric, lactic, tartaric, citric, succinic, phosphoric, sulfuric, maleic, and fumaric acids, inter alia. One or both of the basic groups may be thus salified, by using the appropriate quantity of acid, yielding for example the mono- or di-hydrochloride.

The following examples are illustrative of the invention:

EXAMPLE 1

2-[(β-dimethylaminoethyl) (hexadienyl,2,4)-amino] pyridine, and salts thereof (a) Preparation of 2-[(β-dimethylaminoethyl) (hexadienyl,2,4)-amino] pyridine.—A solution of 67 g. of 2-[(β-dimethylaminoethyl)-amino] pyridine [J. A. C. S. 67, 394 (1945); 68, 2001 (1946)] in 150 ml. of toluene is added, with stirring, to a suspension of 17.2 g. of sodamide in 150 ml. of toluene. After the initial reaction has subsided, the mixture is refluxed for one hour, cooled, and 58 g. of 2,4-hexadienyl chloride [Helv. Chim. Acta. 15, 256 (1932)] in 200 ml. of toluene is added dropwise. The mixture is refluxed for two hours, cooled and filtered; and the solvent is removed under reduced pressure. The residue is fractionated at reduced pressure, yielding about 32 g. of a base, 2-[(β-dimethylaminoethyl) (hexadienyl,2,4)-amino] pyridine, boiling at about 131-135° C./0.5 mm.

(b) Preparation of the hydrochloride of the base.—One equivalent of 2N alcoholic hydrogen chloride is added to 22 g. of the base; and the solution is diluted with ether and filtered. Recrystallization of the precipitate from methyl ethyl ketone gives about 14.5 g. of a white crystalline material, the monohydrochloride of 2-[(β-dimethylaminoethyl) (hexadienyl,2,4) - amino] pyridine, melting at about 137-138° C.

(b: alternative) Preparation of the dihydrochloride of the base.—By adding two equivalents of the alcoholic hydrogen chloride to the base, the white crystalline dihydrochloride is obtained, melting at about 200-202° C.

(b: alternative) Preparation of the maleate of the base.—A solution of 1.94 g. of maleic acid in 5 ml. isopropanol is added to 4.1 g. of the base in 5 ml. of isopropanol; and the solution is diluted with ether and filtered. The precipitate 2-[(β-dimethylaminoethyl) (hexadienyl,2,4) - amino] pyridine maleate recrystallized from isopropanol, is a white crystalline product melting at about 131–132° C. (yield about 4.0 g.).

EXAMPLE 2

*2-[(β - dimethylaminoethyl) (3 - chloro - hexadienyl, 2,4)-amino] pyridine, and maleate thereof*

(a) *Preparation of 2-[(β-dimethylaminoethyl) (3-chloro-2,4-hexadienyl)-amino] pyridine.*—A solution of 67 g. of 2-[(β-dimethylaminoethyl)-amino] pyridine in 150 ml. of toluene is added with stirring to a suspension of 20.7 g. of sodamide in 200 ml. of toluene. After the initial reaction has subsided, the mixture is refluxed for one hour, cooled, and 80 g. of 1,3-dichloro-2,4-hexadiene [J. A. C. S. 55, 2048 (1933)] in 200 ml. of toluene is added dropwise. The reaction mixture is refluxed for ten hours, cooled, and filtered; and the solvent is removed under reduced pressure, and the residue rapidly distilled at 0.3 mm. pressure. Refractionation of the distillate yields about 41.6 g. of the unreacted pyridine and about 38.2 g. of a pale yellow base, 2-[(β-dimethylaminoethyl) (3-chloro-2,4-hexadienyl) - amino] pyridine; the product boils at about 145–150° C. (0.3 mm. pressure) and has an $n_D^{25}$ 1.5660.

(b) *Preparation of the maleate of the base.*—A solution of 13.1 g. of maleic acid in 60 ml. of isopropyl alcohol is added to 32.68 g. of the base in 100 ml. of isopropyl alcohol, and the resulting crystals are recovered. After two crystallizations from 100 ml. portions of isopropyl alcohol, about 24.0 g. of the maleate is obtained as a colorless, needle-like, crystalline product, melting at about 134–135° C.

EXAMPLE 3

*2-[(gamma - diethylaminopropyl) (hexadienyl, 2,4)-amino] pyridine, and salts thereof*

Using a molar equivalent of 2-[(gamma-diethylaminopropyl)-amino] pyridine [J. A. C. S. 67, 394 (1945)] in place of the 2-[(β-dimethylaminoethyl)-amino] pyridine in Example 1, 2-[(gamma-diethylaminopropyl) (hexadienyl,2,4)-amino] pyridine, as well as its hydrochlorides and maleate, are obtained.

EXAMPLE 4

*[(β-dimethylaminoethyl) (hexadienyl,2,4)-amino] benzene, and salts thereof*

Using a molar equivalent of [(β-dimethylaminoethyl)-amino] benzene [J. A. C. S. 68, 1999 (1946)] in place of the 2-[(β-dimethylaminoethyl)-amino] pyridine in Example 1, [(β-dimethylaminoethyl) (hexadienyl, 2, 4)-amino] benzene, as well as its hydrochlorides and maleate, are obtained.

The invention may be variously otherwise embodied within the scope of the appended claims.

We claim:

1. A compound of the class consisting of: bases of the general formula

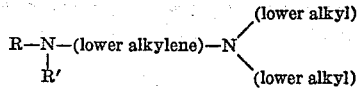

wherein R is a member of the class consisting of hexadienyl,2,4 and 3-chloro-hexadienyl,2,4, and R' is a member of the class consisting of phenyl and 2-pyridyl groups; and acid-addition salts thereof.

2. An acid-addition salt of a base of the general formula

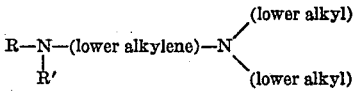

wherein R is a member of the class consisting of hexadienyl,2,4 and 3-chloro-hexadienyl,2,4, and R' is a member of the class consisting of phenyl and 2-pyridyl groups.

3. An acid-addition salt of a base of the general formula

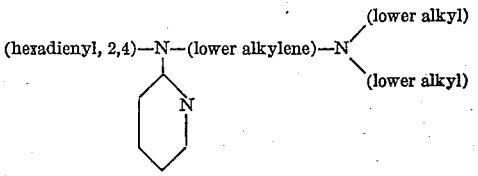

4. An acid-addition salt of a base of the general formula

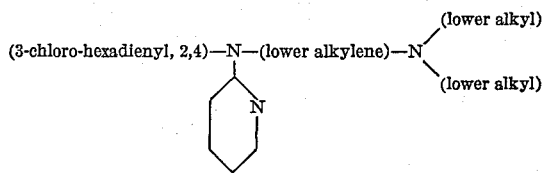

5. An acid-addition salt of 2-[(β-dimethylaminoethyl) (hexadienyl,2,4)-amino] pyridine.

6. An acid-addition salt of 2-[(β-dimethylaminoethyl) (3 - chloro-hexadienyl,2,4)-amino] pyridine.

7. The method which essentially comprises interacting a member of the group consisting of 2,4-hexadienyl chloride and 1,3-dichloro-2,4-hexadiene with a compound of the general formula

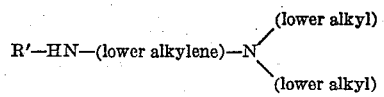

in an organic solvent for the reactants, in the presence of an alkaline condensing agent, R' being a member of the class consisting of phenyl and 2-pyridyl groups.

WILLIAM A. LOTT.
EDWARD PRIBYL.

No references cited.